(12) United States Patent
Okuno

(10) Patent No.: US 7,746,545 B2
(45) Date of Patent: Jun. 29, 2010

(54) BROADBAND LIGHT SOURCE DEVICE

(75) Inventor: Toshiaki Okuno, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 183 days.

(21) Appl. No.: 12/081,121

(22) Filed: Apr. 10, 2008

(65) Prior Publication Data

US 2009/0252467 A1 Oct. 8, 2009

(30) Foreign Application Priority Data

Apr. 11, 2007 (JP) .............................. 2007-104162

(51) Int. Cl.
*G02F 1/35* (2006.01)
*G02F 2/02* (2006.01)
*G02B 6/00* (2006.01)

(52) U.S. Cl. ............................. 359/326; 372/6; 385/122

(58) Field of Classification Search ......... 359/326–332; 385/122; 372/6
See application file for complete search history.

(56) References Cited

U.S. PATENT DOCUMENTS

| 7,034,988 B2 * | 4/2006 | Tamai et al. ................. 359/326 |
| 7,538,936 B2 * | 5/2009 | Yokoyama ................... 359/328 |
| 2009/0097512 A1 * | 4/2009 | Clowes et al. ................. 372/21 |

OTHER PUBLICATIONS

Femto Fiber Lasers, TOPTICA Photonic AG's Internet website (URL: http://www.toptica.com/products/itemla_yer/97/BR-41003E-FFS-2006-12.pdf search on Apr. 11, 2007).

Konstantinos Moutzouris et al.: "Highly efficient second, third and fourth harmonic generation from a two- branch femtosecond erbium fiber source," Optics Express, vol. 14, No. 5, pp. 1905-1912, Mar. 6, 2006.
E. Raikkonen et al: "Supercontinuum generation by nanosecond dual-wavelenght pumping in microstructured optical fibers," Optics Express, vol. 14, No. 17, pp. 7914-7923, Aug. 21, 2006.
Pierre-Alain Champert et al. : "White-light supercontinuum generation in normally dispersive optical fiber using original multi-wavelength pumping system," Optics Express, vol. 12, No. 19, pp. 4366-4371, Sep. 20, 2004.
Yu Oishi et al.: "General of extreme ultraviolet continuum radiation driven by a sub-10-fs two-color field," Optics Express, vol. 14, No. 16, pp. 7230-7237, Aug. 7, 2006.
S.C. Zeller et al.: "Octave spanning supercontinuum from compact passively mode-locked Er:Yb:glass laser," CLEO/QELS 06, CThEE1, May 2006.

* cited by examiner

*Primary Examiner*—Daniel Petkovsek
(74) *Attorney, Agent, or Firm*—Venable LLP; Michael A. Sartori; Steven J. Schwarz

(57) ABSTRACT

A broadband light source device that can generate supercontinuum light in a visible range and having a spectrum with a stable shape and high intensity is provided. The broadband light source device includes a diode-pumped solid-state laser light source that outputs seed light in response to being excited by a laser beam output from a semiconductor laser light source; a wavelength converter that receives the seed light to generate wavelength-converted light having a wavelength different from that of the seed light, and outputs the wavelength-converted light; and a nonlinear medium that receives the wavelength-converted light to generate supercontinuum light having a bandwidth of 100 nm or greater included in a wave band of 400 nm to 700 nm inclusive, and outputs the supercontinuum light.

9 Claims, 4 Drawing Sheets

BROADBAND LIGHT SOURCE DEVICE

BACKGROUND OF THE INVENTION

1. Field of the Invention

The present invention relates to broadband light source devices.

2. Description of the Related Art

Supercontinuum light (SC light) is a type of broadband light that has a high-output, broad-band, and flat spectrum. For this reason, SC light is expected to be used in various fields of application, such as for light measurement and near-infrared spectroscopy. In particular, SC light in a visible range of 400 nm to 700 nm is much researched for its application to displays.

Page 14 of the document "FemtoFiber Lasers" in TOPTICA Photonics AG's Internet website (URL: http://www-toptica.com/products/itemla_yer/97/BR-41003E-FFS-2006-12.pdf, searched on Apr. 11, 2007) describes a broadband light source device FFS.SYS-SHG-PCF. In this broadband light source device, an erbium-doped fiber laser is used as a seed light source, and an output laser beam is guided to a photonic crystal fiber (PCF) where a nonlinear optical phenomenon is caused to occur. Utilizing this nonlinear optical phenomenon, SC light in a visible range is generated. However, in a seed light source including an erbium-doped fiber laser, a light amplifier such as an erbium-doped fiber amplifier is used in order to obtain high output necessary for wavelength conversion. This unfavorably leads to problems such as an increase in cost and a distorted waveform of the output light. A distorted waveform of the output laser beam (i.e. an incident beam on a PCF) leads to a lower wavelength conversion efficiency, thus making it difficult to obtain high-intensity and stable SC light.

SUMMARY OF THE INVENTION

Accordingly, it is an object of the present invention to provide a broadband light source device that can generate SC light in a visible range and having a spectrum with a stable shape and high intensity.

In order to achieve the aforementioned object, the present invention provides a broadband light source device which includes a diode-pumped solid-state laser light source that outputs seed light in response to being excited by a laser beam output from a semiconductor laser light source; a wavelength converter that receives the seed light to generate wavelength-converted light having a wavelength different from that of the seed light, and outputs the wavelength-converted light; and a nonlinear medium that receives the wavelength-converted light to generate supercontinuum light (SC light) having a bandwidth of 100 nm or greater included in a wave band of 400 nm to 700 nm inclusive, and outputs the SC light.

In the broadband light source device according to the present invention, the nonlinear medium preferably receives the wavelength-converted light output from the wavelength converter and outputs SC light having a bandwidth of 200 nm or greater. In that case, since at least two of the primary colors of visible light can be obtained, the device can be applied to displays. In addition, the device may be configured to check, for example, the absorption, dispersion, and reflection intensity for every wavelength component of light so that the device can be applied to a detection device that detects a plurality of subjects simultaneously.

In the broadband light source device according to the present invention, the nonlinear medium preferably receives the wavelength-converted light output from the wavelength converter and outputs SC light having a spectrum that includes a wave band of 400 nm to 700 nm inclusive. In that case, since the three primary colors of red, blue, and green light can all be obtained, a full-color display that uses SC light can be realized. In addition, the device becomes capable of detecting even more number of subjects simultaneously.

DESCRIPTION OF THE PREFERRED EMBODIMENTS

The above-mentioned features and other features, aspects, and advantages of the present invention will be better understood through the following description, appended claims, and accompanying drawings. In the explanation of the drawings, an identical mark is applied to identical elements and a redundant explanation will be omitted.

First Embodiment

Figure 1:
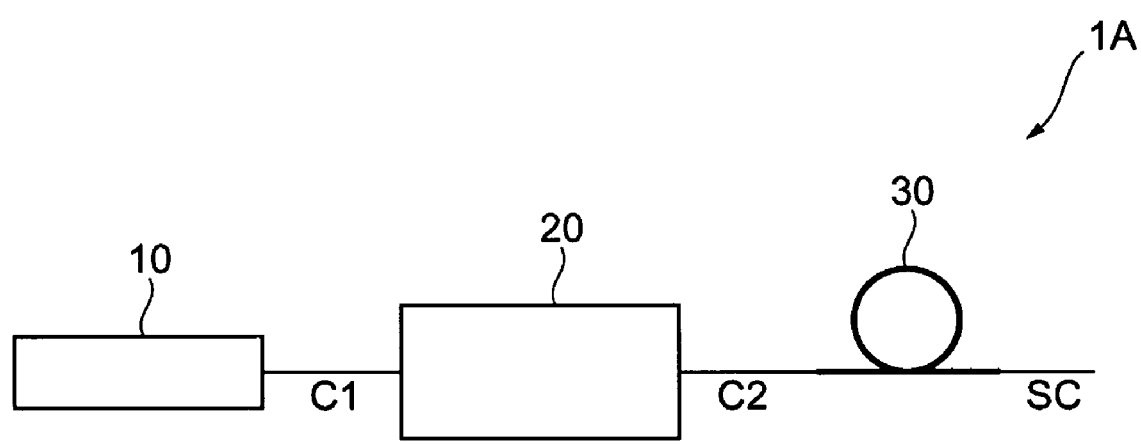
FIG. 1 schematically illustrates a broadband light source device according to a first embodiment of the present invention.

FIG. 1 schematically illustrates a broadband light source device 1A according to a first embodiment of the present invention. The broadband light source device 1A includes a diode-pumped solid-state laser (DPSSL) light source 10, a frequency multiplier 20 serving as a wavelength converter, and an optical fiber 30 serving as a nonlinear medium. The DPSSL light source 10 is a light source that is excited by a laser beam output from a semiconductor laser light source, and outputs a laser beam C1 as seed light. The frequency multiplier 20 is, for example, a nonlinear crystal and receives the laser beam C1 output from the DPSSL light source 10 so as to generate and output a second harmonic laser beam C2. The optical fiber 30 receives and guides the laser beam C2, by which a nonlinear optical phenomenon occurs. This nonlinear optical phenomenon causes the spectrum band of the laser beam C2 to be widened. Thus, the optical fiber 30 generates supercontinuum light (SC light) having a gentle spectral shape over a broad band within the visible range or including the visible range, and outputs the SC light from an output terminal.

The laser beam C1 output from the DPSSL light source 10 preferably has a center wavelength of 1550 nm. On the other hand, the second harmonic laser beam C2 has a center wavelength of 775 nm. Since the center wavelength of the laser beam C1 output from the DPSSL light source 10 is within a wavelength range of 1500 nm and 1600 nm inclusive, a light source that can be manufactured readily using a general-purpose material such as erbium-doped glass can be used as the DPSSL light source 10.

The optical fiber 30 is preferably a photonic crystal fiber (PCF). More specifically, a hexagonal PCF having a core diameter of 1.7 μm is preferred. A hexagonal PCF is an optical fiber whose nonlinearity and dispersion properties can be designed freely to a certain extent by forming six holes having the same diameter at equal intervals in a cylinder centered around a core within cladding. In a PCF, there is a large difference in refractive indices between the core and the cladding. For this reason, PCFs have stronger confinement of light than general optical fibers and allow for high-density light propagation. This implies that a nonlinear optical phenomenon tends to occur readily in a PCF. Since a PCF can be designed to have a zero-dispersion wavelength within a visible range of 400 nm to 700 nm, SC light included in a wave band of 400 nm to 700 nm inclusive can be readily obtained.

Figure 2:
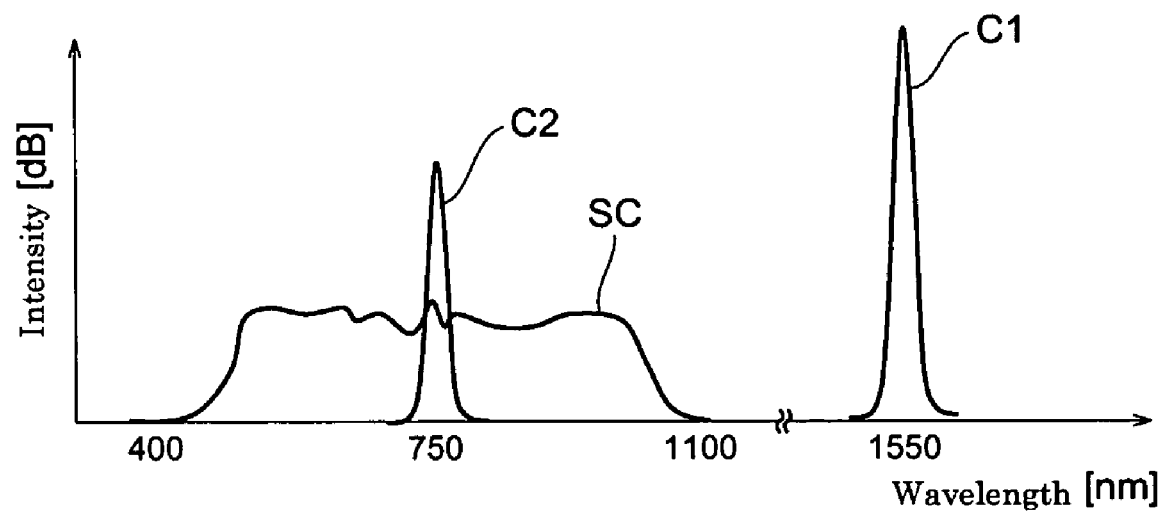
FIG. 2 is a graph showing a spectrum of a laser beam C1 output from a DPSSL light source, a spectrum of a laser beam C2 output from a frequency multiplier, and a spectrum of SC light output from an optical fiber, where all of the light source, frequency multiplier, and optical fiber are included in the broadband light source device according to the first embodiment.

FIG. 2 is a graph showing a spectrum of the laser beam C1 output from the DPSSL light source 10, a spectrum of the laser beam C2 output from the frequency multiplier 20, and a spectrum of the SC light output from the optical fiber 30, where all of the light source 10, frequency multiplier 20, and optical fiber 30 are included in the broadband light source device 1A. The laser beam C1 and the laser beam C2 respectively have center wavelengths of 1550 nm and 775 nm. The laser beam C2 has a stable spectral shape. The SC light output from the optical fiber 30 is within a wave band of 400 nm to 1100 nm and has no significant difference in spectral intensity from 450 nm to 1100 nm. Thus, the SC light has a stable spectral shape and high output.

When an erbium-doped fiber laser light source is used as a light source as in the past, an erbium-doped fiber amplifier is employed to perform light amplification. For this reason, the waveform and the spectral shape of the output light becomes distorted. In contrast, in the present invention where a DPSSL light source is used as a light source, the peak power of output light is sufficiently high without having to perform light amplification. Thus, the output light can have a stable spectral shape. Specifically, for example, in a DPSSL light source that outputs femtosecond pulses, a nice soliton waveform with a power of 100 mW, a pulse time width of 200 fs, a spectral bandwidth of 13 nm, and a value of 0.35 or lower determined by multiplying the pulse time width by a frequency width (corresponding to the spectral bandwidth) can be obtained.

Using the DPSSL light source 10 in this manner, a stable and high-output wavelength-converted laser beam C2 can be obtained with a simple configuration without the use of a light amplifier. In addition, by allowing the laser beam C2 to be input to and optically guided by the optical fiber 30 (PCF), a nonlinear optical phenomenon is caused to occur within the optical fiber 30. Due to this nonlinear optical phenomenon, SC light having a spectrum with a stable shape and high intensity over a broad band of 400 nm to 1100 nm that includes the visible range of 400 nm to 700 nm inclusive can be obtained.

Although the first embodiment of the present invention has been described above, the first embodiment permits various modifications to an extent that they do not depart from the scope of the invention. For example, the optical fiber 30 may be a high nonlinear soft glass fiber or a soft-glass-based holey fiber, an optical waveguide or a silicon waveguide having a submicron core diameter, a hollow fiber having gas such as argon sealed therein, an optical crystal such as sapphire, a BO-7 glass plate, or a tapered fiber. The optical fiber 30 and the frequency multiplier 20 may be coupled to each other with an optical fiber or may be spatially coupled to each other.

In the first embodiment, the DPSSL light source 10 is preferably a pulse laser light source that outputs a mode-locked pulse laser beam as seed light. Since a pulse laser beam output from such a light source has a high peak power and a stable spectral shape, high-output wavelength-converted light having a stable spectral shape can be obtained. Due to the same reason, high-output SC light having a stable spectral shape can also be obtained.

Alternatively, the DPSSL light source 10 may be a pulse laser light source that outputs an asynchronous pulse laser beam as seed light. In that case, an asynchronous pulse laser beam having a high peak power can be obtained with a simple configuration without having to perform specific control using an acousto-optic device or an electro-optic device. Consequently, SC light and wavelength-inverted light having a high spectral intensity can be obtained without the use of a light amplifier as in the case of an erbium-doped fiber laser light source.

As a further alternative, the DPSSL light source 10 may be a laser light source in which ytterbium-doped glass is used as an amplification medium. In that case, since the laser beam C1 to be output will have a center wavelength near 1.06 μm, the second harmonic laser beam C2 will have a center wavelength near 530 nm.

Second Embodiment

Figure 3:
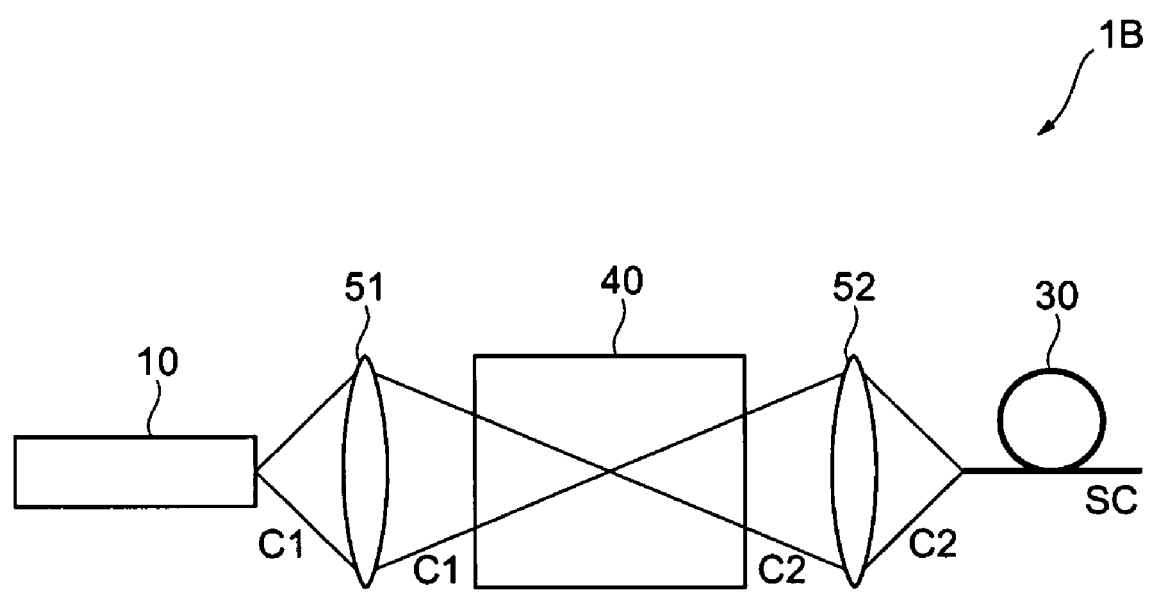
FIG. 3 schematically illustrates a broadband light source device according to a second embodiment of the present invention.

FIG. 3 schematically illustrates a broadband light source device 1B according to a second embodiment of the present invention. The broadband light source device 1B includes a DPSSL light source 10, an optical fiber 30, periodically poled lithium niobate (PPLN) 40 as a wavelength converter, a condenser lens 51, and a condenser lens 52. The PPLN 40 is a polarization-inverted crystal in which the direction of spontaneous polarization of lithium niobate ($LiNbO_3$) is inverted alternately by 180°. The PPLN 40 receives a laser beam C1 output as seed light from the DPSSL light source 10, and generates and outputs a third harmonic laser beam C2. Since the PPLN 40 can freely design an output wavelength by periodically changing the invertible polarization structure, the PPLN 40 is capable of performing wavelength conversion at high efficiency over a broad wavelength range. Thus, the PPLN 40 can readily generate the third harmonic laser beam C2 of the laser beam C1.

The condenser lens 51 condenses the laser beam C1 output as seed light from the DPSSL light source 10 and allows the condensed laser beam C1 to be incident on the PPLN 40. The condenser lens 51 is disposed between the DPSSL light source 10 and the PPLN 40. An incident axis of the laser beam C1 incident on the condenser lens 51 after being output from the DPSSL light source 10, an optical axis of the condenser lens 51, and a longitudinal central axis of the PPLN 40 are all aligned with each other. The condenser lens 51 is disposed such that the condensing point thereof is located on the longitudinal central axis of the PPLN 40.

The condenser lens 52 condenses the third harmonic laser beam C2 output from the PPLN 40 and allows the condensed laser beam C2 to be incident on an input terminal of the optical fiber 30. The condenser lens 52 is disposed between the PPLN 40 and the optical fiber 30. The longitudinal central axis of the PPLN 40, the optical axis of the condenser lens 52, and the axial direction of the optical fiber 30 are all aligned with each other. A tip end of the input terminal of the optical fiber 30 is disposed at the condensing point of the condenser lens 52.

In the broadband light source device 1B, the laser beam C1 output as seed light from the DPSSL light source 10 is condensed by the condenser lens 51 before entering the PPLN 40. The laser beam C1 becomes a third harmonic laser beam C2 in the PPLN 40. The laser beam C2 is subsequently output from the PPLN 40. Then, the laser beam C2 is condensed by the condenser lens 52 before becoming incident on and optically guided by the optical fiber 30. In the optical fiber 30, a nonlinear optical phenomenon occurs and causes the spectrum band of the laser beam C2 to be amplified. As a result, SC light having a gentle spectral shape over a broad band within the visible range or including the visible range is generated. The SC light is then output from an output terminal of the optical fiber 30.

It is preferable that the laser beam C1 output from the DPSSL light source 10 have a center wavelength of 1550 nm and that the third harmonic laser beam C2 of the laser beam C1 have a center wavelength of 517 nm. Here, the optical fiber 30 is preferably a PCF or a tapered fiber. More specifically, a hexagonal PCF having a core diameter of 1.7 μm or a tapered fiber having an outer diameter of 1.2 μm is preferred. A tapered fiber can be fabricated simply by stretching a single-mode optical fiber while softening the optical fiber with, for example, a heater, burner, or $CO_2$ laser. A tapered fiber can be easily made to have a zero-dispersion wavelength within a visible range of 400 nm to 700 nm, whereby SC light included in a wave band of 400 nm to 700 nm inclusive can be readily obtained.

Figure 4A:
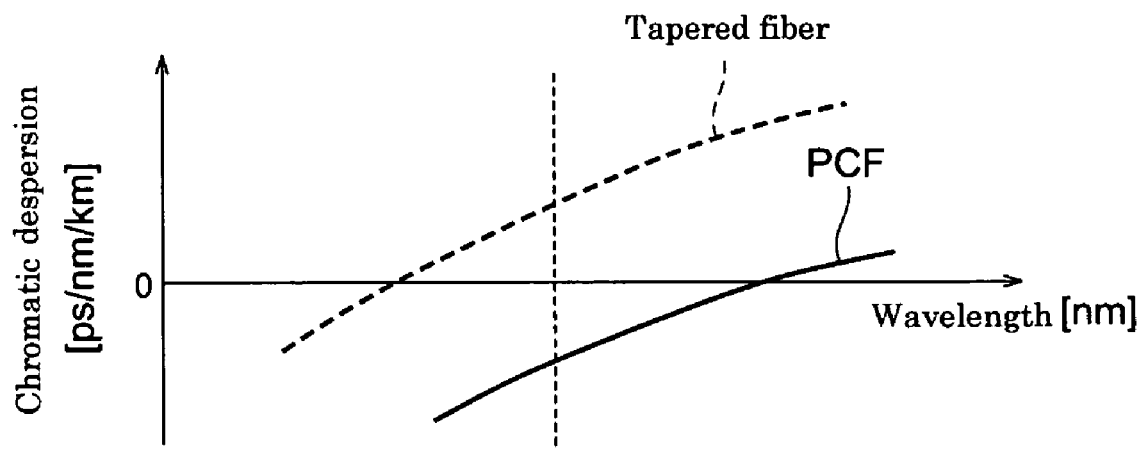
FIG. 4A is a graph showing chromatic dispersion characteristics of an optical fiber included in the broadband light source device according to the second embodiment.

FIG. 4A is a graph showing chromatic dispersion characteristics of the optical fiber 30 included in the broadband light source device 1B. The solid line corresponds to a case where a hexagonal PCF with a 1.7-μm core diameter is used as the optical fiber 30, whereas the chain line corresponds to a case where a tapered fiber with a 1.2-μm outer diameter is used as the optical fiber 30. The hexagonal PCF with the 1.7-μm core diameter and the tapered fiber with the 1.2-μm outer diameter differ from each other in terms of their dispersion characteristics.

Figure 4B:
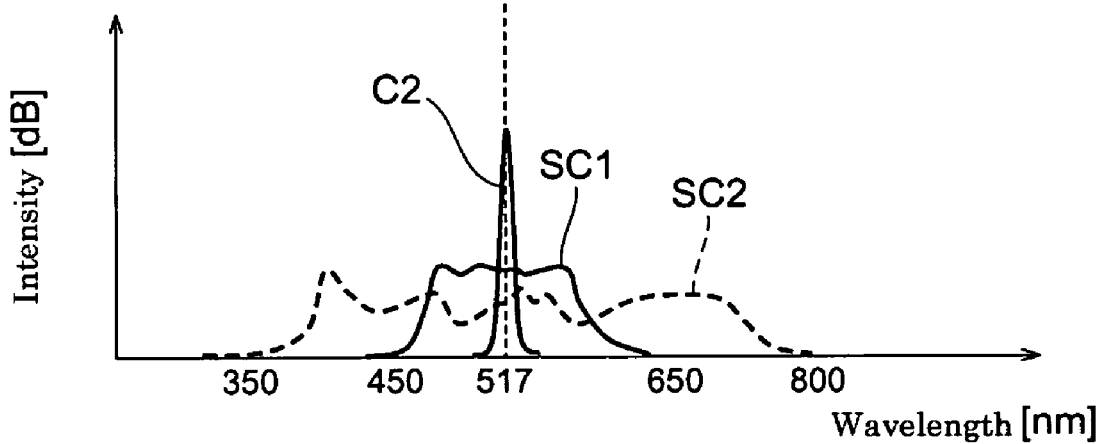
FIG. 4B is a graph showing spectra of broadband light output from the broadband light source device.

FIG. 4B is a graph showing spectra of broadband light output from the broadband light source device 1B. The graph shows a spectrum of a laser beam C2 input to the optical fiber 30, a spectrum of SC light in the case where the optical fiber 30 is a hexagonal PCF with a 1.7-μm core diameter (solid line), and a spectrum of SC light in the case where the optical fiber 30 is a tapered fiber with a 1.2-μm outer diameter (chain line). The laser beam C2 has a spectrum with a stable shape and high intensity. In the case where the optical fiber 30 is a hexagonal PCF with a 1.7-μm core diameter (SC1), the SC light is within a wave band of 450 nm to 600 nm. The SC light shows no significant changes in spectral intensity from 470 nm to 580 nm and has a stable spectral shape with high intensity. In the case where the optical fiber 30 is a tapered fiber with a 1.2-μm outer diameter (SC2), the SC light is within a wave band of 350 nm to 800 nm and has a stable spectral shape.

Using the DPSSL light source 10 in this manner, a stable and high-output wavelength-converted laser beam C2 can be obtained without the use of a light amplifier. In addition, by allowing the wavelength-converted laser beam C2 to be input to and optically guided by the optical fiber 30 defined by a PCF or a tapered fiber, a nonlinear optical phenomenon is caused to occur within the optical fiber 30. Due to this nonlinear optical phenomenon, SC light having a spectrum with a stable shape and high intensity over a broad band that includes the visible range of 400 nm to 700 nm inclusive can be obtained.

The second embodiment permits various modifications to an extent that they do not depart from the scope of the invention. For example, the optical fiber 30 may be a high nonlinear soft glass fiber or a soft-glass-based holey fiber, an optical waveguide or a silicon waveguide having a submicron core diameter, a hollow fiber having gas such as argon sealed therein, an optical crystal such as sapphire, or a BO-7 glass plate. The outer diameter of the tapered fiber may be at a submicron level. The wavelength converter may alternatively be a nonlinear crystal such as potassium titanyl phosphate (KTP), barium borate (BBO), lithium triborate (LBO), or lithium indium sulfide (LiInS). In that case, wavelength-converted light can be readily obtained. The DPSSL light source 10 may alternatively be a laser light source in which ytterbium-doped glass is used as an amplification medium. In that case, since the laser beam C1 to be output will have a center wavelength near 1.06 μm, the third harmonic laser beam C2 will have a center wavelength near 350 nm.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2007-104162 filed on Apr. 11, 2007 including the specification, claims, drawings, and summary are incorporated herein by reference in its entirety.

What is claimed is:

1. A broadband light source device comprising:
   a diode-pumped solid-state laser light source that outputs seed light in response to being excited by a laser beam output from a semiconductor laser light source;
   a wavelength converter that receives the seed light to generate wavelength-converted light having a wavelength different from that of the seed light, and outputs the wavelength-converted light; and
   a nonlinear medium that receives the wavelength-converted light to generate supercontinuum light having a bandwidth of 100 nm or greater included in a wave band of 400 nm to 700 nm inclusive, and outputs the supercontinuum light.

2. The broadband light source device according to claim 1, wherein the seed light has a center wavelength that is within a wavelength range of 1500 nm to 1600 nm inclusive.

3. The broadband light source device according to claim 1, wherein the diode-pumped solid-state laser light source comprises a pulse laser light source that outputs a mode-locked pulse laser beam as the seed light.

4. The broadband light source device according to claim 1, wherein the diode-pumped solid-state laser light source comprises a pulse laser light source that outputs an asynchronous pulse laser beam as the seed light.

5. The broadband light source device according to claim 1, wherein the wavelength converter includes a periodically poled lithium niobate crystal.

6. The broadband light source device according to claim 1, wherein the wavelength converter includes a nonlinear crystal.

7. The broadband light source device according to claim 1, wherein the nonlinear medium comprises a photonic crystal fiber.

8. The broadband light source device according to claim 1, wherein the nonlinear medium comprises a tapered fiber.

9. The broadband light source device according to claim 1, wherein the nonlinear medium receives the wavelength-converted light output from the wavelength converter and outputs supercontinuum light having a bandwidth of 200 nm or greater.

* * * * *